United States Patent
Park

(10) Patent No.: US 9,652,056 B2
(45) Date of Patent: May 16, 2017

(54) TOUCH-ENABLE CURSOR CONTROL METHOD AND ELECTRONIC DEVICE THEREOF

(71) Applicant: Samsung Electronics Co., Ltd., Gyeonggi-do (KR)

(72) Inventor: Hyung-Jin Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 85 days.

(21) Appl. No.: 14/210,984

(22) Filed: Mar. 14, 2014

(65) Prior Publication Data

US 2014/0327614 A1    Nov. 6, 2014

(30) Foreign Application Priority Data

May 3, 2013    (KR) .................. 10-2013-0049905

(51) Int. Cl.
*G06F 3/0354* (2013.01)
*G06F 3/041* (2006.01)
*G06F 3/0488* (2013.01)
*G06F 3/0484* (2013.01)

(52) U.S. Cl.
CPC ........ *G06F 3/03547* (2013.01); *G06F 3/0416* (2013.01); *G06F 3/0488* (2013.01); *G06F 3/04842* (2013.01); *G06F 2203/04101* (2013.01)

(58) Field of Classification Search
CPC ...... G06F 3/011; G06F 3/017; G06F 3/03547; G06F 3/0416; G06F 3/0418; G06F 3/04842; G06F 3/0488; G06F 2203/04101; G06F 2203/04108; G06F 2203/04801; B60K 2350/1012; B60K 2350/1028

See application file for complete search history.

(56) References Cited

U.S. PATENT DOCUMENTS

| | | | |
|---|---|---|---|
| 5,455,906 A | 10/1995 | Usuda | |
| 8,749,494 B1* | 6/2014 | Delker | ................. G06F 3/0488 345/173 |
| 2006/0244735 A1* | 11/2006 | Wilson | .......................... 345/173 |
| 2008/0273755 A1* | 11/2008 | Hildreth | ........................ 382/103 |
| 2009/0021387 A1* | 1/2009 | Hosono | ...................... 340/686.1 |
| 2009/0237371 A1 | 9/2009 | Kim et al. | |
| 2010/0020037 A1* | 1/2010 | Narita et al. | .................. 345/173 |
| 2010/0214244 A1 | 8/2010 | Kim | |
| 2011/0242038 A1* | 10/2011 | Kakuta et al. | ................ 345/173 |
| 2011/0285657 A1 | 11/2011 | Shimotani et al. | |
| 2011/0316679 A1 | 12/2011 | Pihlaja | |
| 2012/0007805 A1* | 1/2012 | Kim | ..................... G06F 3/0416 345/159 |
| 2012/0050181 A1 | 3/2012 | King et al. | |

(Continued)

FOREIGN PATENT DOCUMENTS

EP    0 572 031 A1    12/1993
WO    2012/077273 A1    6/2012

(Continued)

*Primary Examiner* — Keith Crawley
(74) *Attorney, Agent, or Firm* — Cha & Reiter, LLC

(57) ABSTRACT

A method of operating a touch screen and an electronic device thereof are provided. The method includes the operations of sensing an object approaching the touch screen, and displaying a pointer at a predetermined position of the touch screen in response to the object.

18 Claims, 15 Drawing Sheets

(56) References Cited

U.S. PATENT DOCUMENTS

| | | |
|---|---|---|
| 2012/0050211 A1 | 3/2012 | King et al. |
| 2012/0075212 A1* | 3/2012 | Park .................... G06F 3/04886 345/173 |
| 2012/0098919 A1* | 4/2012 | Tang ...................... H04N 7/148 348/14.03 |
| 2012/0102436 A1 | 4/2012 | Nurmi |
| 2012/0133585 A1 | 5/2012 | Han et al. |
| 2012/0299849 A1 | 11/2012 | Homma et al. |
| 2013/0038555 A1* | 2/2013 | Maeda et al. .................. 345/173 |
| 2013/0088454 A1* | 4/2013 | Azuma ................ G06F 3/0416 345/173 |
| 2014/0028557 A1* | 1/2014 | Otake ...................... G09G 5/00 345/158 |
| 2014/0040833 A1* | 2/2014 | McLean ........................ 715/856 |
| 2014/0085260 A1* | 3/2014 | Guarneri .............. G06F 3/0416 345/174 |
| 2014/0160073 A1 | 6/2014 | Matsuki |
| 2014/0225857 A1* | 8/2014 | Ma ........................ G06F 3/0418 345/174 |
| 2014/0253518 A1* | 9/2014 | Takano ................ G06F 3/0418 345/178 |
| 2015/0054780 A1* | 2/2015 | Manba .......................... 345/174 |
| 2015/0138083 A1* | 5/2015 | Takano ................ G06F 3/0488 345/157 |
| 2015/0145772 A1* | 5/2015 | Chien ................ G06F 3/03547 345/158 |
| 2015/0355735 A1* | 12/2015 | Matsuda ............... G06F 3/0488 345/162 |
| 2016/0224221 A1* | 8/2016 | Liu ....................... G06F 3/0488 |

FOREIGN PATENT DOCUMENTS

| | | | |
|---|---|---|---|
| WO | 2012/128296 A1 | 9/2012 | |
| WO | WO2012/157272 | * 11/2012 | ............ G06F 3/048 |
| WO | 2013/018480 A1 | 2/2013 | |
| WO | 2013/089190 A1 | 6/2013 | |

* cited by examiner

TOUCH-ENABLE CURSOR CONTROL METHOD AND ELECTRONIC DEVICE THEREOF

CLAIM OF PRIORITY

This application claims priority under 35 U.S.C. §119(a) to a Korean Patent Application filed in the Korean Intellectual Property Office on May 3, 2013 and assigned Serial No. 10-2013-0049905, the contents of which are herein incorporated by reference.

TECHNICAL FIELD

The example embodiments of the disclosure relate portable electronic devices, and more particularly, to a method of operating a touch screen and an electronic device thereof.

BACKGROUND

Todays, electronic devices for portable phones, Portable Multimedia Players (PMPs), and Personal Digital Assistants (PDAs) are widely spreading as necessities of modern society. Also, owing to the growth of scientific technologies, recently, electronic devices with touch screens enabling touch inputs using the finger or touch pens are becoming popular. Because the current trends favor touch screens, and users desire larger screens, electronic devices equipped with the touch screens are proliferating.

SUMMARY

Various example embodiments of the disclosure provide an electronic device applying a touch screen and an operating method thereof.

Various example embodiments of the disclosure provide a method of operating a touch screen using proximity touch in an electronic device with a touch screen, and an electronic device thereof.

Various example embodiments of the disclosure provide a method of operating a touch screen preventing malfunction of proximity touch in an electronic device with a touch screen, and the electronic device thereof.

The above aspects are achieved by providing a method of operating a touch screen and an electronic device thereof.

According to one embodiment, a method of operating an electronic device having a touch screen is provided. The method includes the operations of sensing an object approaching the touch screen, and displaying a pointer at a predetermined position of the touch screen in response to the object.

According to another embodiment, an electronic device is provided. The electronic device includes a touch screen for sensing an object approaching, and a processor configured to display a pointer at a predetermined position of the touch screen in response to the object.

According to yet another embodiment, a method of operating an electronic device having a touch screen is provided. The method includes the operations of sensing at least a portion of the finger for a predetermined time or longer in a predetermined region of the touch screen, the predetermined region being a region extending from at least one side region of the touch screen, displaying a pointer at a position of the touch screen, a position of the position being determined to be in the direction of a line defined by connecting two points where distances between the finger and the touch screen are the least, moving the pointer in proportion to a movement of the object, selecting contents located at the pointer by touching the touch screen and moving the finger away or towards the touch screen, and removing the pointer when the movement of the finger is not sensed for a second predetermined time or longer in the predetermined region of the touch screen.

BRIEF DESCRIPTION OF THE DRAWINGS

The above, features and advantages of will become more apparent from the following detailed description when taken in conjunction with the accompanying drawings in which.

DETAILED DESCRIPTION

Figure 1:
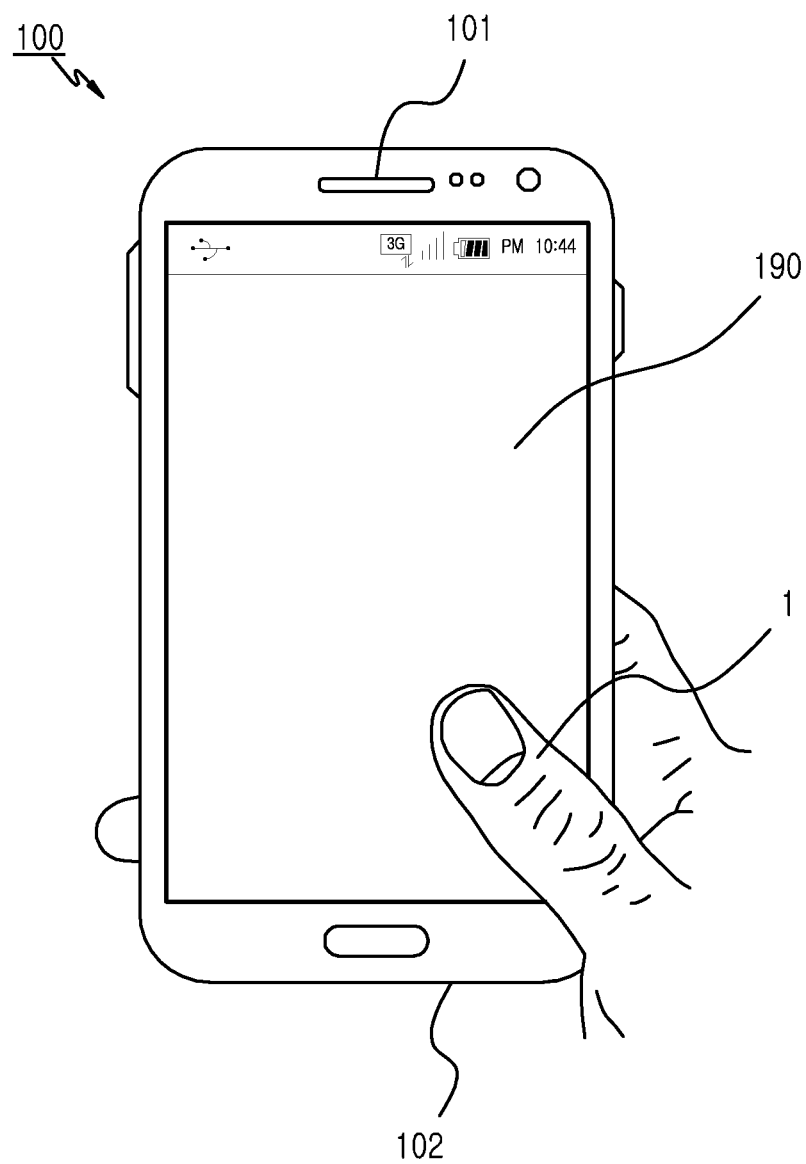
FIG. 1 is a diagram illustrating a state of handling an electronic device with one hand according to one example embodiment among various example embodiments of the disclosure.

The disclosure may make various modifications and may possess various example embodiments. Among them, specific example embodiments will be exemplified in the drawings and will be described in detail in the detailed description. But, these should not be construed to limit the disclosure to a specific embodiment, and should be understood as including all changes, equivalents or substitutes encompassed by the disclosure.

Terms including ordinal numbers such as 1st, 2nd and the like can be used to describe various constituent elements, but the terms do not intend to limit the constituent elements. The terms are used to distinguish one constituent element from other constituent elements. For instance, a 2nd constituent element can be named as a 1st constituent element without departing from the intention of the disclosure and, likewise, the 1st constituent element can be named as the 2nd constituent element.

When it is mentioned that one constituent element is 'coupled or 'accessed' to another constituent element, it should be understood that one constituent element can be directly coupled or accessed to another constituent element or the third constituent element can exist in between the two constituent elements. In contrast, when it is mentioned that one constituent element is 'directly connected' or 'directly accessed' to another constituent element, it should be understood that the third constituent element does not exist in between the two constituent elements.

The terms used in the disclosure are used to describe specific example embodiments, and do not limit the disclosure. The expression of a singular number includes, unless clearly meaning otherwise in a context, the expression of a plural number. In the disclosure, it should be understood that terms of 'including', 'having', etc. intend to indicate the existence of a feature disclosed in an example embodiment, a numeral, a step, an operation, a constituent element, and a part or a combination of them, and do not previously exclude a possibility of existence or supplement of one or more other features, numerals, steps, operations, constituent elements, and parts or a combination of them.

An operation principle of the disclosure will be described herein below with reference to the accompanying drawings. In the following description, well-known functions or constructions are not described in detail since they would obscure the disclosure in unnecessary detail. And, terms described below, which are defined considering functions in the disclosure, can be different depending on user and operator's intention or practice. Therefore, the terms should be defined on the basis of content throughout various example embodiments of the disclosure.

In describing various example embodiments of the disclosure, a portable terminal for communication including a touch screen is illustrated and described as an electronic device, but this should not be construed to limit the scope and spirit of the disclosure. The electronic device can include various devices including touch screens, for example, Personal Digital Assistants (PDAs), laptop computers, smart phones, netbooks, Mobile Internet Devices (MIDs), Ultra Mobile Personal Computers (UMPCs), tablet PCs, navigators, MPEG Audio Layer-3 (MP3) players and the like.

A method of operating the touch screen using proximity touch (also called hovering or non-contact touch) in an electronic device equipped with a touch screen, and the electronic device thereof are described below.

FIG. 1 is a diagram illustrating a state of handling an electronic device with one hand according to one example embodiment among various example embodiments of the disclosure.

Referring to FIG. 1, the electronic device 100 includes a touch screen 190 installed in front face thereof, an earpiece 101 arranged at an upper side thereof, and a microphone 102 arranged at a lower side thereof. For example, a user can perform a touch input to the touch screen 190 using the thumb finger 1 while gripping the electronic device 100 with one hand.

The touch screen 190 of the electronic device 100 can include a touch panel recognizing a touch of a user's human body, for example, the finger or the palm, as will be described later.

According to various example embodiments, the touch panel can be a touch panel recognizing an input of data when a user's finger makes direct contact with a surface of the touch screen 190. The touch screen 190 may be implemented as, for example, a capacitive or resistive screen, as well as other common touch screen solutions. Also, he touch panel can be a touch panel enabling proximity touch (also called hovering or non-contact touch), which recognizes the finger when the finger approaches a sensing region of the touch screen 190 without making direct contact with the touch screen 190.

Figure 2:
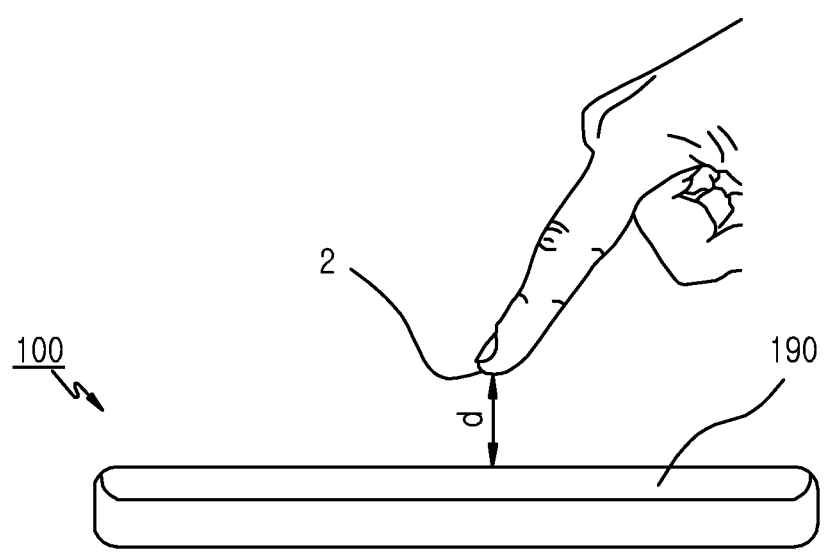
FIG. 2 is a diagram for describing proximity touch in an electronic device according to one example embodiment among various example embodiments of the disclosure.

FIG. 2 is a diagram for describing proximity touch in an electronic device according to one example embodiment among various example embodiments of the disclosure.

Referring to FIG. 2, a user may perform proximity touch (also called hovering or non-contact touch) in the electronic device 100. For example, the touch screen 190 may recognize the finger when the finger approaches the sensing region of the touch screen 190 without direct contact with the touch screen 190.

According to various example embodiments, although not illustrated, the touch screen 190 can include a touch panel which has a sensor Printed Circuit Board (PCB) arranged such that a plurality of X-axis coil arrays and Y-axis coil arrays are right-angled and a connector electrically connected with a mainboard. For example, the touch screen 190 can be operated by applying an alternating signal to a coil formed in a sensing pad and, if the finger approaches this touch screen 190 within a predetermined distance (d), the touch screen 190 can detect a position of corresponding proximity touch by sensing a change of a magnetic field formed in the touch screen 190. For instance, the touch screen 190 may include a pen touch panel recognizing a hovering pen enabling a hovering input.

According to various example embodiments, the electronic device 100 can perform a specific function (for example, zooming in a text displayed on the screen, previewing contents or the like) if an end 2 of the finger is sensed for a predetermined time in a predetermined region of the touch screen 190. Also, the aforementioned predetermined region and predetermined time may be set by a user.

Figure 3A:
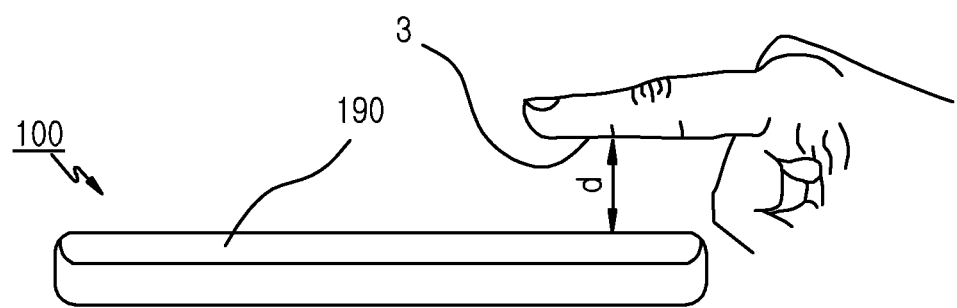
FIG. 3A and FIG. 3B are diagrams for describing a method of operating an electronic device according to one example embodiment among various example embodiments of the disclosure.
Figure 3B:
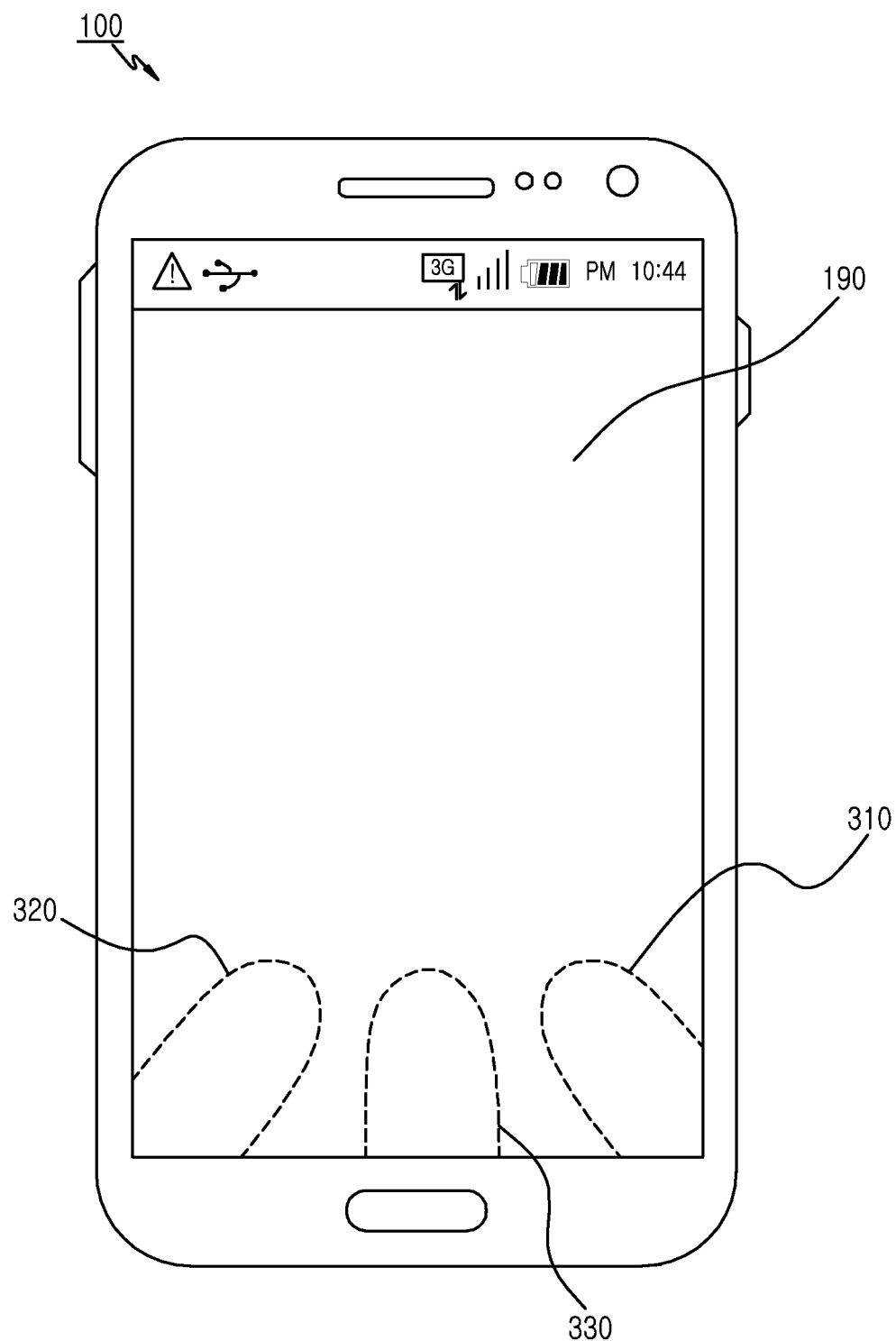

FIGS. 3A and 3B are diagrams for describing a method of operating an electronic device according to one example embodiment among various example embodiments of the disclosure.

Referring to FIGS. 3A and 3B, the electronic device 100 can sense an object approaching the touch screen 190. Here, the object can be a user finger or a hovering pen enabling a hovering input.

According to various example embodiments, the electronic device 100 can sense at least a portion 3 of the finger in a predetermined region of the touch screen 190. For instance, if a user's finger approaches the touch screen 190 with the finger laid down as depicted, the electronic device 100 may sense at least a portion 3 of the finger within a predetermined distance (d) from the touch screen 190 as mentioned above.

According to various example embodiments, in a case where a user handles the electronic device 100 with one hand, the aforementioned predetermined region can be a region extending from at least one side among the left side, right side, and lower side of the touch screen 190 as illustrated in FIG. 3B. For instance, if the user is a right-handed person, it is desirable that the aforementioned predetermined region becomes a 1st region 310, and if the user is a left-handed person, it is desirable that the aforementioned predetermined region becomes a 2nd region 320.

Also, the user may set a 3rd region 330 and other regions as the aforementioned predetermined region according to user's setting.

According to various example embodiments, if the aforementioned at least a portion 3 of the finger is sensed for a predetermined time or longer in the aforementioned set region, the electronic device 100 can enter a pointer setting mode. If entering the pointer setting mode, the electronic device 100 can display a pointer (also called a hovering cursor) in a predetermined position of the touch screen 190. If entering the pointer setting mode, the electronic device 100 can be controlled not to recognize a coordinate or contents directly touched on the touch screen 190.

Figure 4A:
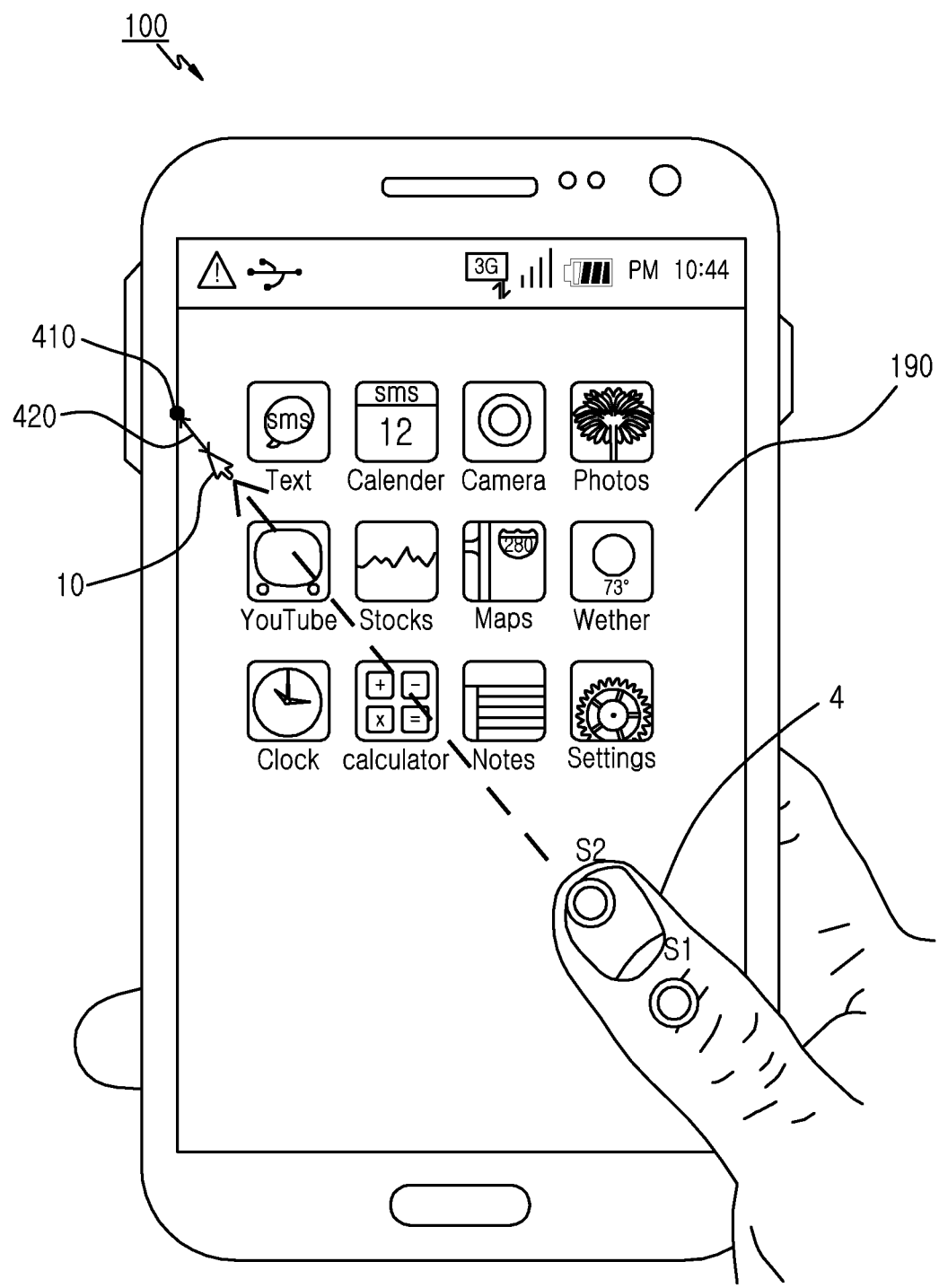
FIG. 4A and FIG. 4B are diagrams for describing a method of operating an electronic device according to one example embodiment among various example embodiments of the disclosure.
Figure 4B:
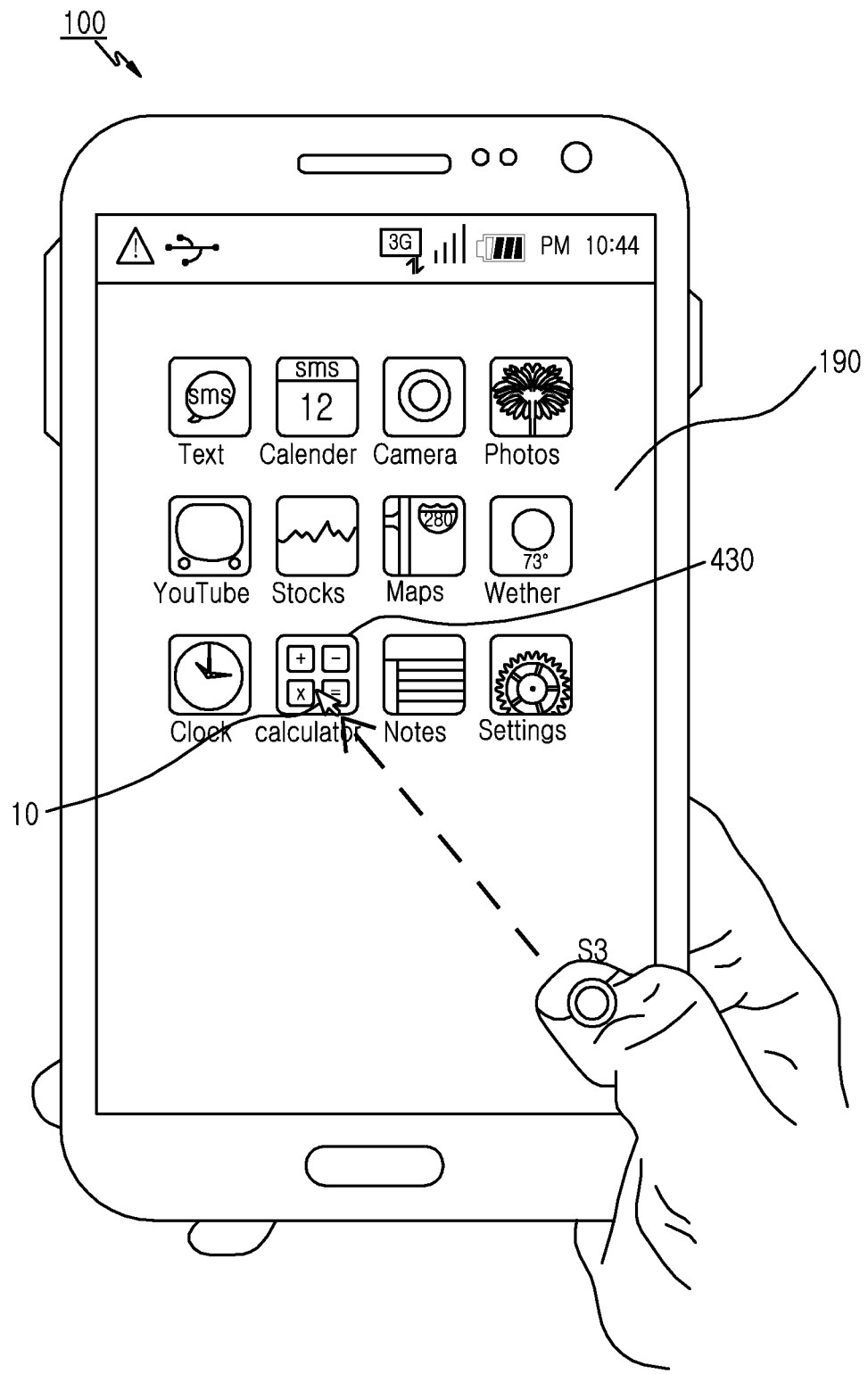

FIGS. 4A and 4B are diagrams for describing a method of operating an electronic device according to one example embodiment among various example embodiments of the disclosure.

Referring to FIGS. 4A and 4B, it is the case where the electronic device 100 senses at least a portion of a user finger 4 for a predetermined time or longer in the aforementioned predetermined region. In this case, for example, the electronic device 100 can enter a pointer setting mode, and display a pointer 10 (also called a hovering cursor) in a predetermined position of the touch screen 190. If entering the pointer setting mode, the electronic device 100 can be controlled not to recognize a coordinate or contents directly touched on the touch screen 190.

According to various example embodiments, a position of the aforementioned pointer 10 can be determined to be in the direction of connecting two points (S1 and S2) at which distances between at least a portion of the finger 4 and the touch screen 190 are the least. For example, the pointer 10 can be displayed at a point spaced a predetermined distance 420 apart from a point 410 which adjoins the edge of the touch screen 190 in the aforementioned direction from a position of the finger 4. Also, the pointer 10 may be displayed distant from the finger 4 in the length direction of the finger 4.

According to various example embodiments, the pointer 10 can move in proportion to the movement of the finger 4. For instance, as in FIG. 4B, when a user pulls (i.e., bends) the finger 4 toward a right lower end of the touch screen 190, the electronic device 100 can recognize a coordinate of a point (S3) at which a distance between the finger 4 and the touch screen 190 is the least and also, the pointer 10 can move in right lower direction. For instance, the amount of movement of the pointer 10 can be a double of the amount of movement of the finger 4, or the user may diversely set a movement ratio of the pointer 10 to the finger 4.

According to various example embodiments, the user can select contents 430 located at the pointer 10. For example, the user can select the contents 430 when touching the touch screen 190 or moving the finger 4 in the direction of getting away from or getting close to the touch screen 190. Also, the electronic device 100 may perform a specific function when the user performs a drag or a subsequent touch on the touch screen 190.

According to various example embodiments, the electronic device 100 can remove the aforementioned pointer 10 when not sensing the movement of the finger 4 in a predetermined region of the touch screen 190 or when not sensing the movement of the finger 4 for a predetermined time or longer in the predetermined region of the touch screen 190. Also, for instance, the electronic device 100 may remove the aforementioned pointer 10 when the finger 4 moves from the predetermined region of the touch screen 190 to a 2nd predetermined region thereof. Here, the 2nd predetermined region can be an edge portion of the touch screen 190. It can include a case where the finger 4 moves to the 2nd predetermined region while maintaining a state of active proximity touch.

Figure 5A:
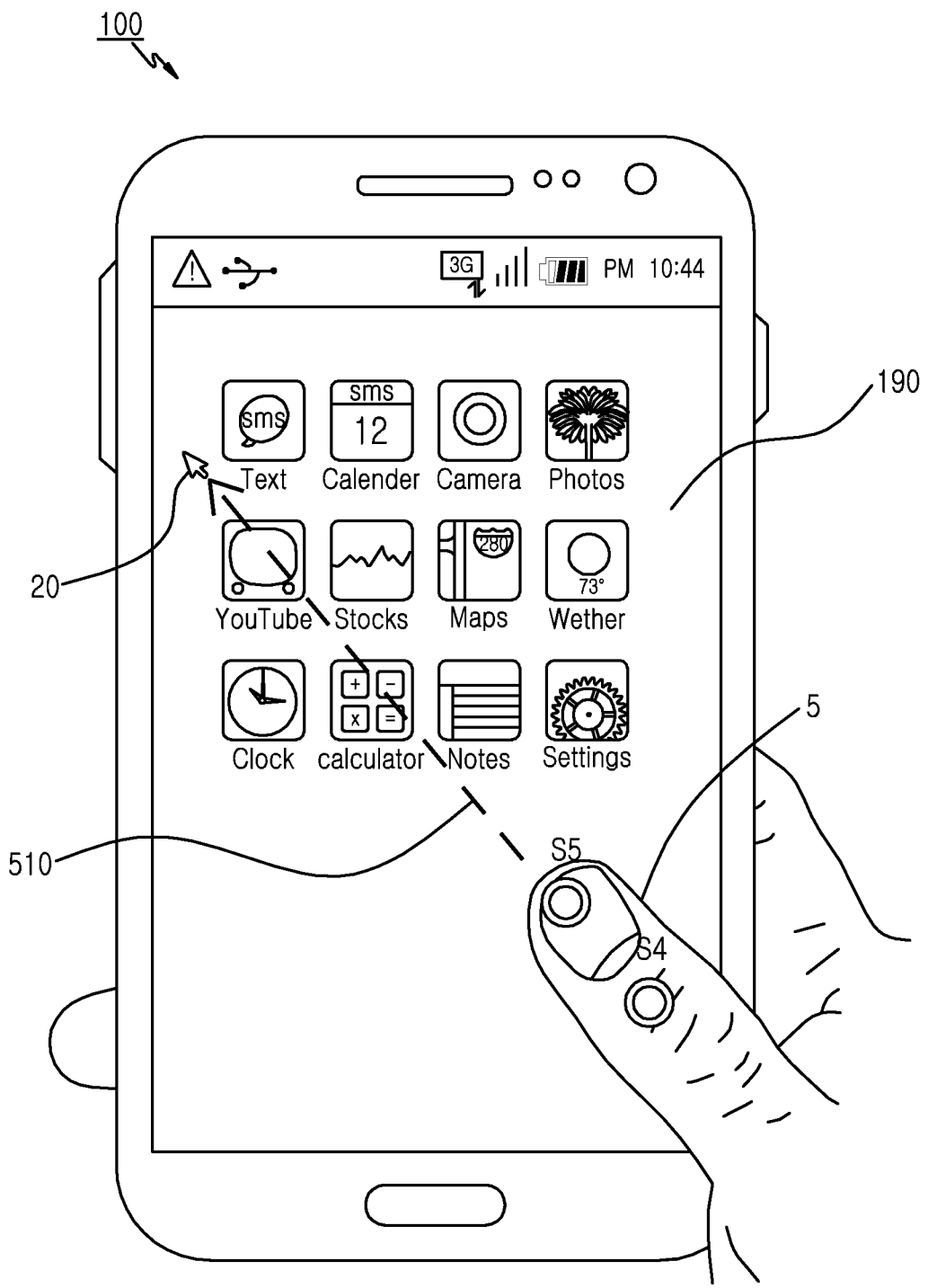
FIG. 5A and FIG. 5B are diagrams for describing a method of operating an electronic device according to one example embodiment among various example embodiments of the disclosure.
Figure 5B:
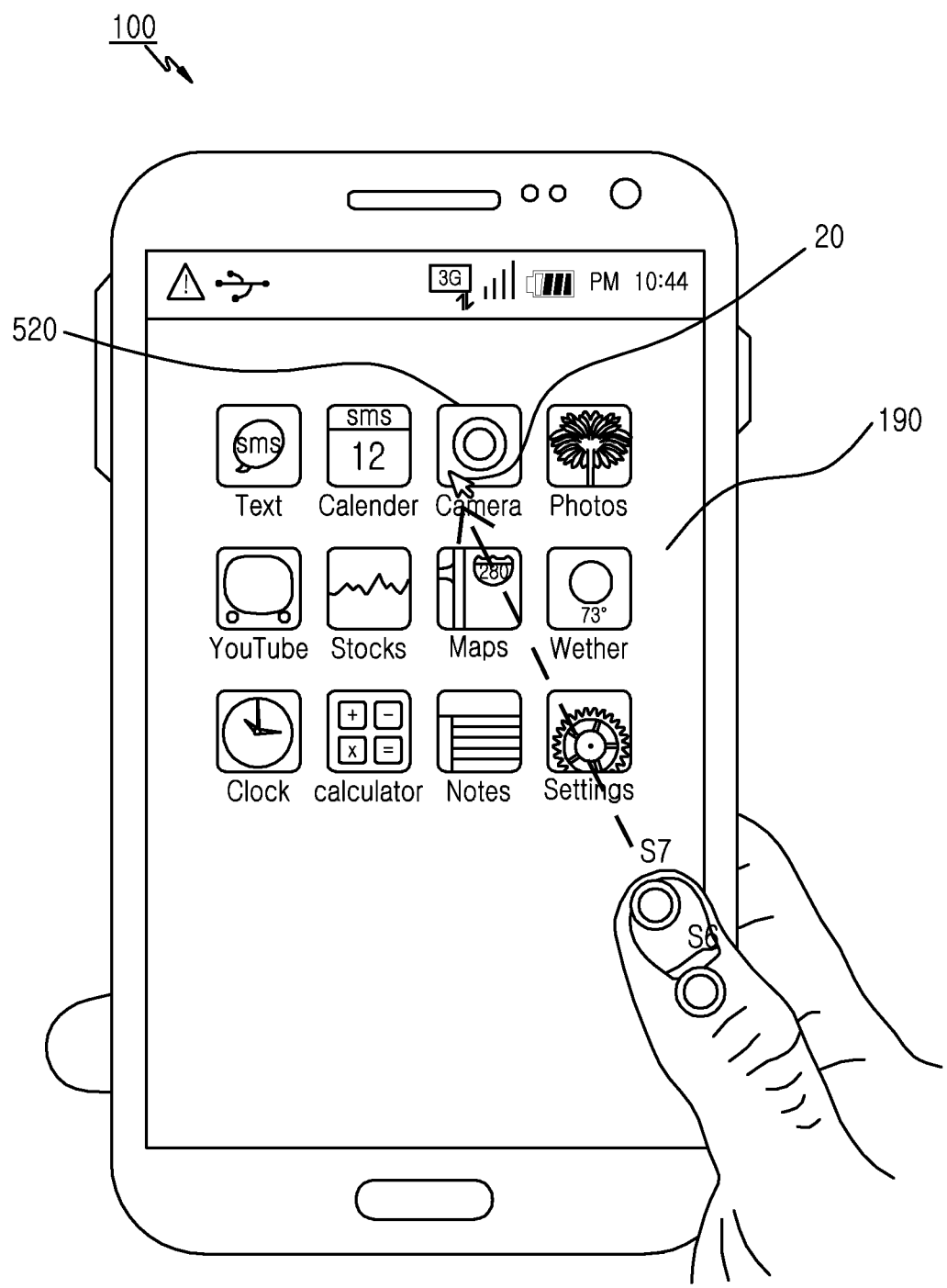

FIGS. 5A and 5B are diagrams for describing a method of operating an electronic device according to one example embodiment among various example embodiments of the disclosure.

Referring to FIGS. 5A and 5B, it is the case where the electronic device 100 senses at least a portion of a user finger 5 for a predetermined time or longer in the aforementioned predetermined region. In this case, the electronic device 100 can display a pointer 20 in a predetermined position of the touch screen 190.

According to various example embodiments, a position of the aforementioned pointer 20 can be determined to be in the direction of connecting two points (S4 and S5) at which distances between at least a portion of the finger 5 and the touch screen 190 are the least. For example, the pointer 20 may be displayed distant a predetermined distance 510 from the finger 5 in the length direction of the finger 5.

According to various example embodiments, the pointer 20 can move in proportion to the movement of the finger 5. For example, as in FIG. 5B, if the finger 5 is moved in the right direction of the touch screen 190, the movement direction of the pointer 20 can be determined to be in the direction of connecting two points (S6 and S7) at which distances between the finger 5 and the touch screen 190 are the least. As aforementioned, the pointer 20 can move in right direction. For instance, the amount of movement of the pointer 20 can be a double of the amount of movement of the finger 5, or the user may diversely set a movement ratio of the pointer 20 to the finger 5.

According to various example embodiments, the user can select contents 520 located at the pointer 20. For example, the user can select the contents 520 when touching the touch screen 190 or moving the finger 5 in the direction of getting away from or getting close to the touch screen 190. Also, the electronic device 100 may perform a specific function when the user performs a drag or a subsequent touch on the touch screen 190.

According to various example embodiments, the electronic device 100 can remove the aforementioned pointer 20 when it no longer senses movement of the finger 5 in a predetermined region of the touch screen 190, or when it no longer senses the movement of the finger 5 for a predetermined time or longer while the pointer 20 is in the predetermined region of the touch screen 190. Also, for instance, the electronic device 100 may remove the aforementioned pointer 20 when the finger 5 moves from the predetermined region of the touch screen 190 to a 2nd predetermined region thereof. Here, the 2nd predetermined region can be an edge portion of the touch screen 190. It can include a situation where the finger 5 moves to the 2nd predetermined region in a state of keeping proximity touch.

Figure 6:
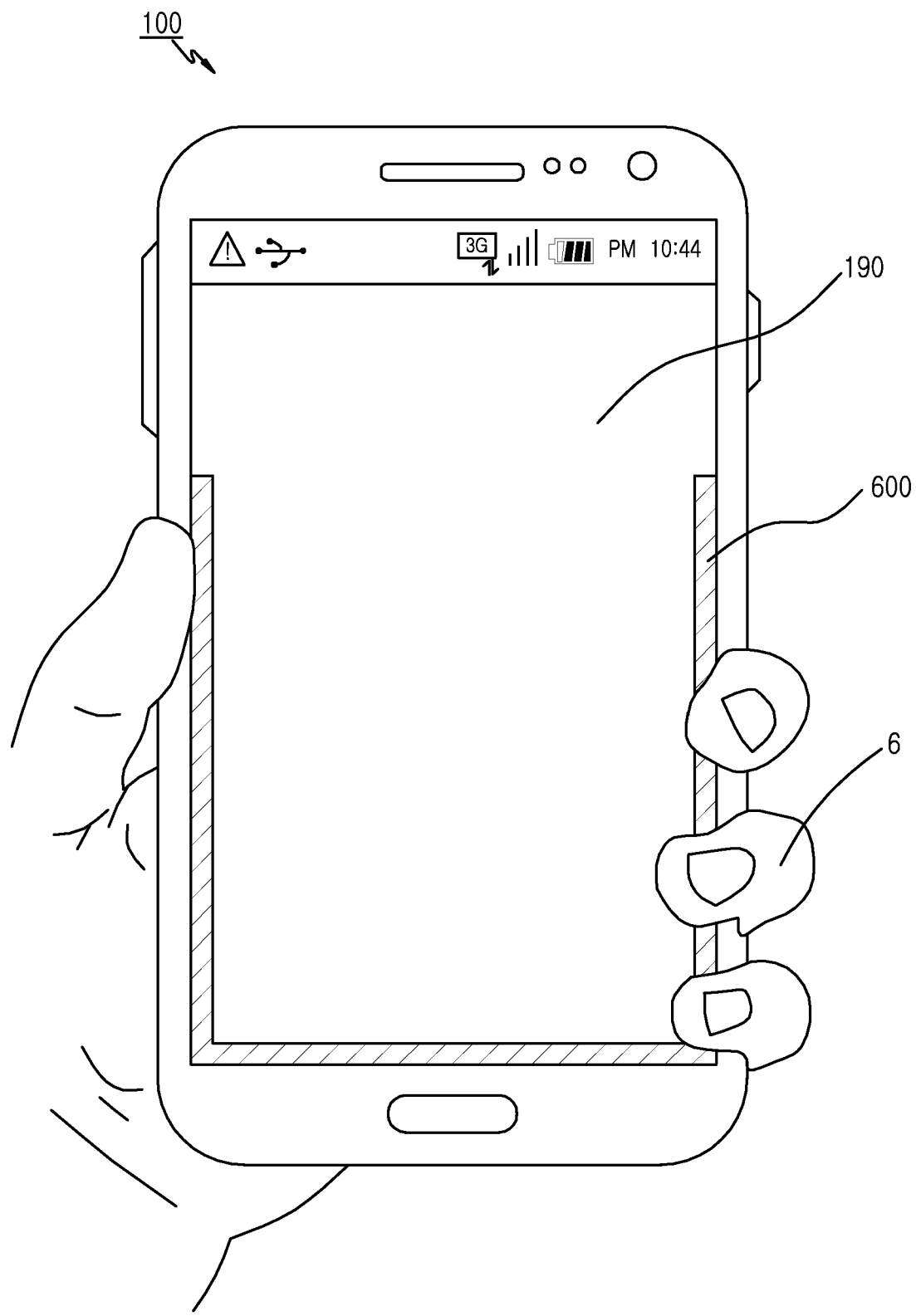
FIG. 6 is a diagram for describing a lock region of an electronic device according to one example embodiment among various example embodiments of the disclosure.

FIG. 6 is a diagram for describing a lock region of an electronic device according to one example embodiment among various example embodiments of the disclosure.

Referring to FIG. 6, the electronic device 100 can include a lock region 600 that may constitute, for example, at least a portion of the edge of the touch screen 190. According to various example embodiments, the lock region 600 can include a grip sensor capable of sensing a gripped position of the electronic device 100 when a user grips the electronic device 100. For instance, in a case where the user performs proximity touch for a predetermined time or longer in a predetermined region of the touch screen 190 (as described above), he/she can unintentionally perform proximity touch in an unwanted region in a process of gripping the electronic device 100 with one hand 6. This unwanted proximity touch can result in the malfunction of the electronic device 100. To prevent the malfunction, the aforementioned grip sensor can be provided to detect a grip position of the hand 6 to deactivate a touch panel for a corresponding portion of the lock region 600. The aforementioned grip sensor can include a capacitive sensor or proximity sensor, for example. Also, the touch screen 190 can include a touch panel separated according to the lock region 600.

Figure 7:
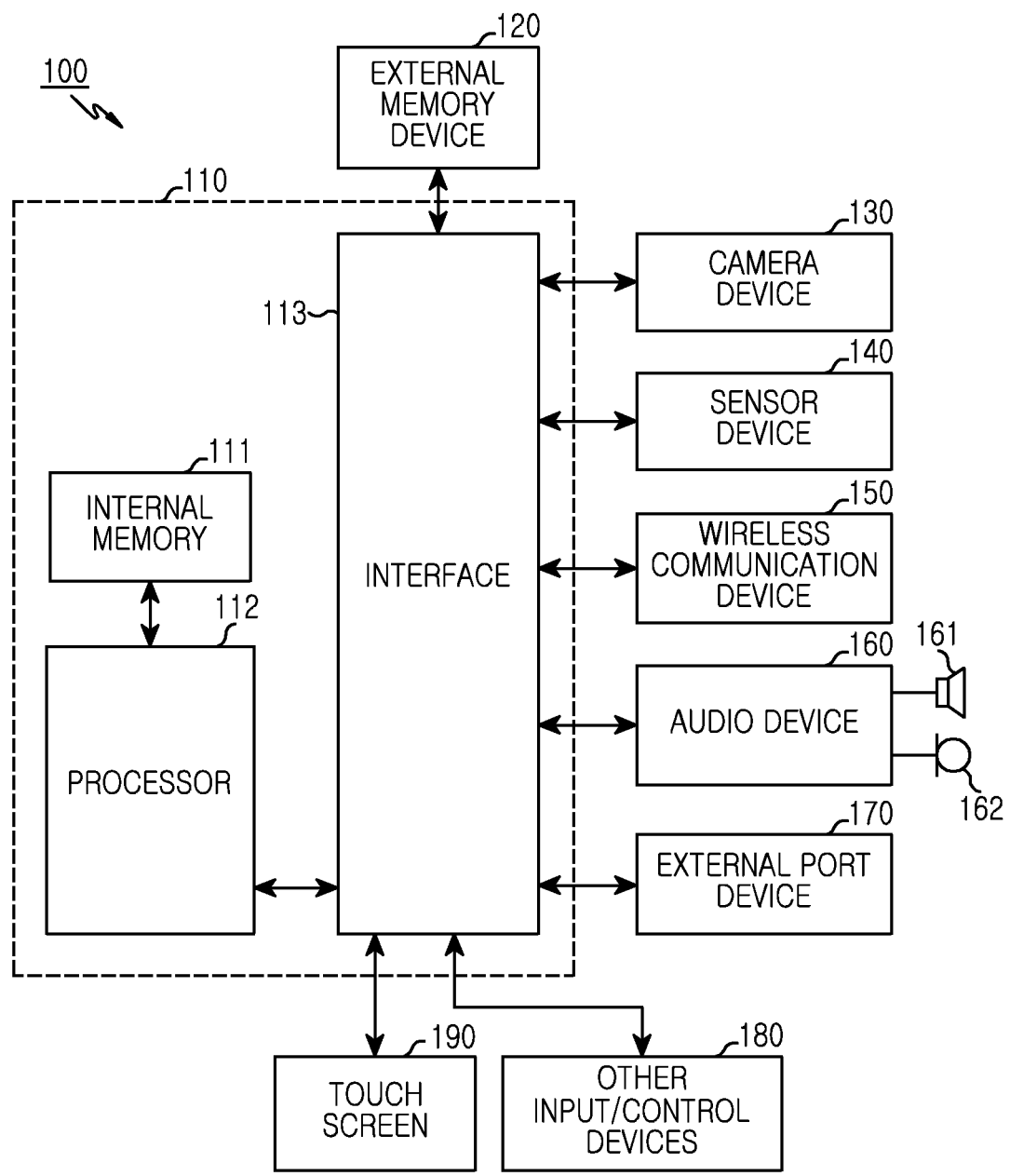
FIG. 7 is a block diagram illustrating a construction of an electronic device according to one example embodiment among various example embodiments of the disclosure.

FIG. 7 is a block diagram illustrating a construction of an electronic device according to one example embodiment among various example embodiments of the disclosure.

Referring to FIG. 7, the electronic device 100 can be a device such as a mobile phone, a media player, a tablet computer, a handheld computer, or a Personal Digital Assistant (PDA). Also, the electronic device 100 may be any mobile terminal including a device having a combination of two or more functions among these devices.

The electronic device 100 can include a host device 110, an external memory device 120, a camera device 130, a sensor device 140, a wireless communication device 150, an audio device 160, an external port device 170, a touch screen 190, or other input/control devices 180. Also, the external memory device 120 and the external port device 170 can be included in plural.

The host device 110 can include an internal memory 111, one or more processors 112, and an interface 113. The internal memory 111, the one or more processors 112, and the interface 113 can be separate constituent elements or can be included in one or more integrated circuits.

The processor 112 can execute various software programs and perform various functions of the electronic device 100, and perform processing and control for voice communication, video communication, and data communication. Also, in addition to this general function, the processor 112 can execute a software module stored in the internal memory 111 and/or external memory device 120 and perform various functions corresponding to the executed module.

For example, the processor 112 can interwork with the software modules stored in the internal memory 111 and/or external memory device 120 and perform methods of various example embodiments of the disclosure. Also, the processor 112 can include one or more data processors, image processors, or codecs. Further, the electronic device 100 may separately construct the data processor, the image processor, or the codec.

The interface 113 can connect the host device 110 with various devices of the electronic device 100.

The camera device 130 can perform a camera function of photo and video clip recording and the like. The camera device 130 can be a Charged Coupled Device (CCD), a Complementary Metal-Oxide Semiconductor (CMOS) or the like.

Also, the camera device 130 can adjust the change of a hardware configuration, for example, the movement of a lens, the number of the irises and the like, according to a camera program executed by the processor 112.

Various constituent elements of the electronic device 100 can be connected with one another through one or more communication buses (not denoted by reference numerals) or electrical connection means (not denoted by reference numerals).

The sensor device 140 can include a grip sensor, a motion sensor, an optical sensor, a temperature sensor and the like and enable various functions. For example, the motion sensor can sense a motion of the electronic device 100, and the optical sensor can sense ambient light. Also, the grip sensor can be attached to at least a portion of the edge of the electronic device 100 to sense a grip. The aforementioned grip sensor can include a capacitive sensor or a proximity sensor, for example.

The wireless communication device 150 enables wireless communication, and can include a wireless frequency transmitter/receiver and an optical (e.g., infrared) transmitter/receiver. The wireless communication device 150 can be designed to operate through one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network or/and a Bluetooth network according to a communication network.

The audio device 160 is connected to a speaker 161 and a microphone 162 to take charge of audio input and output of voice recognition, voice replication, digital recording, call function and the like. Also, the audio device 160 can receive a data signal from the host device 110, convert the received data signal into an electrical signal, and output the converted electrical signal through the speaker 161.

The speaker 161 may be arranged in at least, for example, a rear of the electronic device 100, and converts an electrical signal into an audible frequency band to output the audible frequency band. The speaker 161 can include a flexible film speaker which has one vibrational film and at least one piezoelectric material attached to the one vibrational film.

The microphone 162 can convert a sound wave forwarded from human or other sound sources into an electrical signal. Also, the audio device 160 can receive the electrical signal from the microphone 162, convert the received electrical signal into an audio data signal, and transmit the converted audio data signal to the host device 110. The audio device 160 can include an earphone, headphone, or headset that is detachable from the electronic device 100.

The external port device 170 can direct connect the electronic device 100 with other electronic devices, or indirect connect the electronic device 100 with other electronic devices through a network (for example, the Internet, an intranet, a wireless LAN and the like).

The touch screen 190 can provide an input and output interface between the electronic device 100 and a user. The touch screen 190 can apply a touch-sensitive technology. The touch screen 190 can forward a user's touch input to the host device 110 and show visual information, for example, a text, a graphic, a video and the like provided from the host device 110 to the user. The touch screen 190 can further apply any multi touch sensitive technology including other proximity sensor arrays or other elements in addition to capacitive, resistive, infrared and surface acoustic wave technologies.

According to various example embodiments, although not illustrated, the touch screen 190 can include a touch panel which has a sensor PCB arranged such that a plurality of X-axis coil arrays and Y-axis coil arrays are right-angled and a connector electrically connected with a mainboard. For example, the touch screen 190 can be operated by applying an alternating signal to a coil formed in a sensing pad and, if the finger approaches this touch screen 190 within a predetermined distance, the touch screen 190 can detect a position of corresponding proximity touch by sensing a change of a magnetic field formed in the touch screen 190.

According to various example embodiments, the touch screen 190 can include at least one display among a Liquid Crystal Display (LCD), an Organic Light Emitting Diode (OLED), an Amorphous Organic Light Emitting Diode (AMOLED), a flexible display, or a three-dimensional display.

The other input/control devices 180 can include an up/down button for volume adjustment. In addition to this, the other input/control devices 180 can include at least one of a push button given a corresponding function, a locker button, a rocker switch, a thumb-wheel, a dial, a stick, or a pointer device such as a stylus and the like.

The external memory device 120 can include high-speed random access memories such as one or more magnetic disc storage devices and/or non-volatile memories, one or more optical storage devices and/or flash memories (e.g., NAND, NOR). The external memory device 120 stores software. The software can include an Operating System (OS) module, a proximity touch sensing module, a communication module, a graphic module, a user interface module, a codec module, a camera module, one or more application modules and the like. The term of module may be expressed as a set of instructions, or an instruction set, or a program.

The OS module means an embedded operating system such as WINDOWS, LINUX, Darwin, RTXC, UNIX, OS X, or VxWorks, and can include various software constituent elements controlling general system operation. The controlling of the general system operation can include memory control and management, storage hardware (device) control and management, power control and management and the like. Also, the OS module can perform even a function of making smooth communications between various hardware (devices) and software constituent elements (modules).

The proximity touch sensing module can include a software constituent element for correcting a proximity touch error recognized in a touch panel Integrated Circuit (IC) and, in addition, can include various routines for proximity touch panel operation support according to the disclosure. For instance, the proximity touch sensing module can include a routine of supporting to activate a touch panel, and a routine of collecting a proximity touch event occurring by the finger and the like in a touch panel activation operation.

The communication module can enable a communication with a computer, a server, a counterpart electronic device of the electronic device 100 and the like through the wireless communication device 150 or the external port device 170.

The graphic module can include various software constituent elements for providing and displaying a graphic on the touch screen 190. The term of graphic represents a text, a web page, an icon, a digital image, a video, an animation and the like.

The user interface module can include various software constituent elements related to a user interface. Also, the user interface module can include information about how a state of the user interface is changed and whether the change of the state of the user interface is carried out in which conditions, and the like.

The codec module can include a software constituent element related to encoding and decoding of a video file.

The camera module can include a camera-related software constituent element for enabling camera-related processes and functions.

The application module can include a browser, an electronic mail (e-mail), an instant message, word processing, keyboard emulation, an address book, a touch list, a widget, Digital Right Management (DRM), voice recognition, voice replication, a position determining function, a location-based service and the like.

The host device 110 can further include additional modules (instructions) in addition to the aforementioned modules. Also, various functions of the electronic device 100 according to various example embodiments of the disclosure can include hardware and/or software including one or more stream processing and/or Application Specific Integrated Circuits (ASICs).

Figure 8:
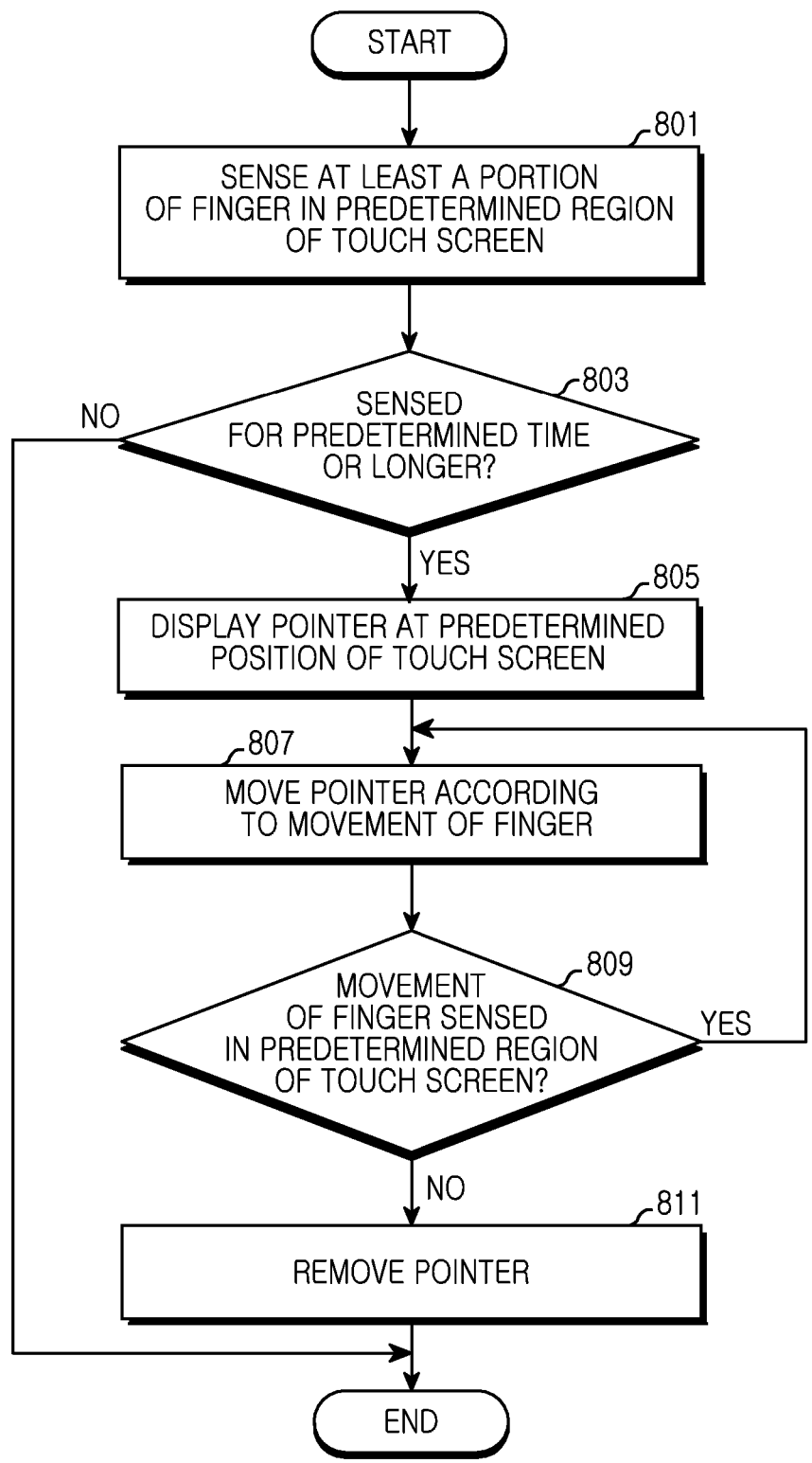
FIG. 8 is a flowchart illustrating a method of operating an electronic device according to one example embodiment among various example embodiments of the disclosure.

FIG. 8 is a flowchart illustrating a method of operating an electronic device according to one example embodiment among various example embodiments of the disclosure.

Referring to FIG. 8, in operation 801, the electronic device 100 can sense at least a portion of the finger in a predetermined region of the touch screen 190. For example, the electronic device 100 can be a device such as a mobile phone including the touch screen 190, a media player, a tablet computer, a handheld computer, or a PDA. Also, the electronic device 100 may be any mobile terminal including a device having a combination of two or more functions among these devices.

According to various example embodiments, the aforementioned touch screen 190 can include a touch panel recognizing an input of data at a time a user's finger makes direct contact with a surface of the touch screen 190 in a capacitive or resistive scheme and the like. Also, this touch panel can be a touch panel enabling proximity touch (also called hovering or non-contact touch) recognizing the finger when the finger approaches a sensing region of the touch screen 190 without contacting the touch screen 190.

According to various example embodiments, the aforementioned predetermined region can be a region extending from at least one side among the left side, right side, and lower side of the touch screen 190, and can be diversely set according to user's setting.

Next, in operation 803, the electronic device 100 can determine whether the at least a portion of the finger has been sensed for a predetermined time or longer. For example, the aforementioned predetermined time can be 3 seconds to 5 seconds, and can be variously set according to user's setting.

After that, in operation 805, the electronic device 100 can display a pointer (also called a hovering cursor) in a predetermined position of the touch screen 190. For instance, the electronic device 100 may enter a pointer setting mode capable of controlling the pointer. If entering the aforementioned pointer setting mode, the electronic device 100 can be configured to that it does not recognize a coordinate or contents directly touched on the touch screen 190.

According to various example embodiments, a position of the aforementioned pointer can be determined to be in the direction of connecting two points at which distances between at least a portion of the finger and the touch screen 190 are the least. For example, the pointer can be displayed at a point spaced a predetermined distance apart from a point which adjoins the edge of the touch screen 190, in the aforementioned direction based on a position of the finger. Also, the pointer may be displayed distant from the finger in the lengthwise direction of the finger.

Next, in operation 807, the electronic device 100 can move the pointer according to the movement of the finger. According to various example embodiments, this pointer can be moved in proportion to the movement of the finger. For example, if the finger is moved in the right direction of the touch screen 190, the pointer can be moved in right direction. For instance, the amount of movement of the pointer can set as a ratio equivalent to double the amount of movement of the finger, or the user may diversely set a custom movement ratio of the pointer to the finger.

After that, in operation 809, the electronic device 100 can determine whether the movement of the finger is sensed in a predetermined region of the touch screen 190. For instance, if the movement of the finger is sensed in the predetermined region of the touch screen 190, the processor 112 can repeat operation 807 and, if not sensed, in operation 811, the processor 112 can control to remove the pointer.

According to various example embodiments, the processor 112 can remove the aforementioned pointer when not sensing the movement of the finger in a predetermined region of the touch screen 190, or when not sensing the movement of the finger for a predetermined time or longer in the predetermined region of the touch screen 190. Also, for instance, the processor 112 may remove the aforementioned pointer when the finger moves from the predetermined region of the touch screen 190 to a 2nd predetermined region thereof. Here, the 2nd predetermined region can be an edge portion of the touch screen 190. It can include a case where the finger moves to the 2nd predetermined region while maintaining a state of proximity touch.

After that, the electronic device 100 terminates the procedure of the disclosure.

An instruction set for this operation can be stored as one or more modules in the aforementioned memory. In this case, the module stored in the memory can be executed by one or more processors 112.

Prior to describing various example embodiments below, it should be noted and understood that some concrete descriptions may be omitted since the later description is similar with the foregoing description.

Figure 9:
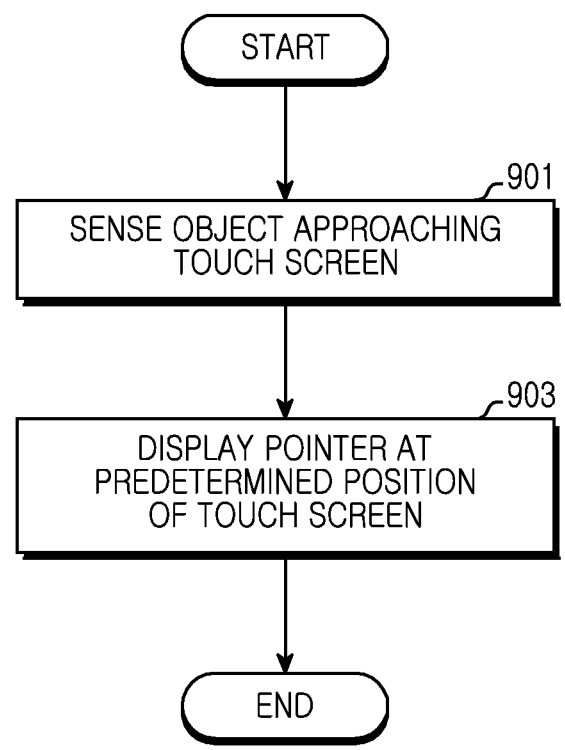
FIG. 9 is a flowchart illustrating a method of operating an electronic device according to one example embodiment among various example embodiments of the disclosure.

FIG. 9 is a flowchart illustrating a method of operating an electronic device according to one example embodiment among various example embodiments of the disclosure.

Referring to FIG. 9, in operation 901, the electronic device 100 can sense an object approaching the touch screen 190. Here, the object can be a user finger or a hovering pen enabling a hovering input. According to various example embodiments, the aforementioned touch screen 190 can include a touch panel recognizing an input of data at a time a user's finger gets in direct touch with a surface of the touch screen 190 in a capacitive or resistive scheme and the like. Also, this touch panel can be a touch panel enabling proximity touch (also called hovering or non-contact touch) recognizing the finger when the finger approaches a sensing region of the touch screen 190 without contacting the touch screen 190.

After that, in operation 903, the electronic device 100 can display a pointer (also called a hovering cursor) in a predetermined position of the touch screen 190. For instance, the electronic device 100 may enter a pointer setting mode, capable of controlling the pointer. According to various example embodiments, a position of the aforementioned pointer can be determined to be in the direction of connecting two points where the distance between at least a portion of the object and the touch screen 190 is the lowest. For example, the pointer can be displayed at a point spaced a predetermined distance apart from a point which adjoins the edge of the touch screen 190 in the aforementioned direction from a position of the object.

After that, the electronic device 100 terminates the procedure of the disclosure.

Figure 10:
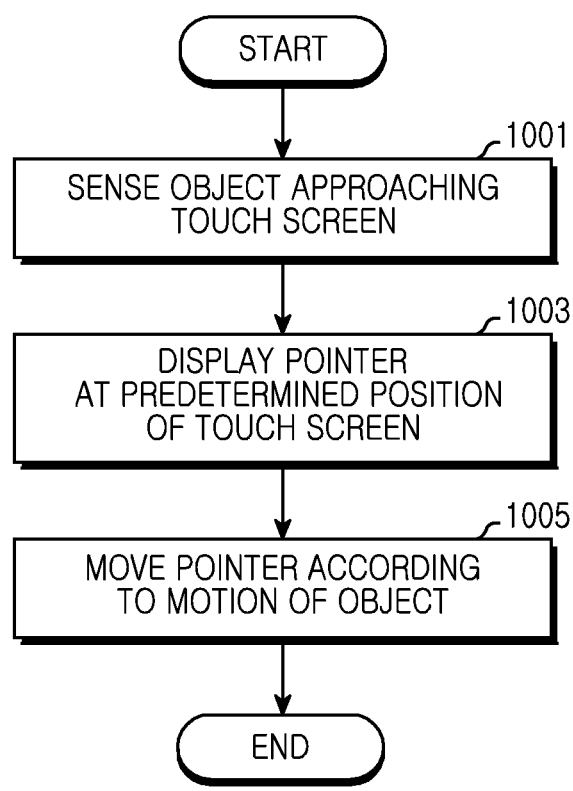
FIG. 10 is a flowchart illustrating a method of operating an electronic device according to one example embodiment among various example embodiments of the disclosure.

FIG. 10 is a flowchart illustrating a method of operating an electronic device according to one example embodiment among various example embodiments of the disclosure.

Referring to FIG. 10, in operation 1001, the electronic device 100 can sense an object approaching the touch screen 190. Here, the object can be a user finger or a hovering pen enabling a hovering input. According to various example embodiments, the aforementioned touch screen 190 can include a touch panel recognizing an input of data when a user's finger makes direct contact with a surface of the touch screen 190 in a capacitive or resistive scheme and the like. Also, this touch panel can be a touch panel enabling proximity touch (also called hovering or non-contact touch) recognizing the finger at a time the finger approaches a sensing region of the touch screen 190 without contacting the touch screen 190.

After that, in operation 1003, the electronic device 100 can display a pointer (also called a hovering cursor) in a predetermined position of the touch screen 190. For instance, the electronic device 100 may enter a pointer setting mode capable of controlling the pointer. According to various example embodiments, a position of the aforementioned pointer can be determined to be in the direction of connecting two points at which distances between at least a portion of the object and the touch screen 190 are the least. For example, the pointer can be displayed at a point spaced a predetermined distance apart from a point which adjoins the edge of the touch screen 190 in the aforementioned direction from a position of the object.

Next, in operation 1005, the electronic device 100 can move the pointer according to the movement of the object. According to various example embodiments, this pointer can move in proportion to the movement of the object. For example, if the object is moved in the right direction of the touch screen 190, the pointer can be moved in right direction. For instance, the amount of movement of the pointer can be set at a ratio equivalent to double of the amount of movement of the object, or the user may diversely set a custom movement ratio of the pointer to the object.

Next, the electronic device 100 terminates the procedure of the disclosure.

Figure 11:
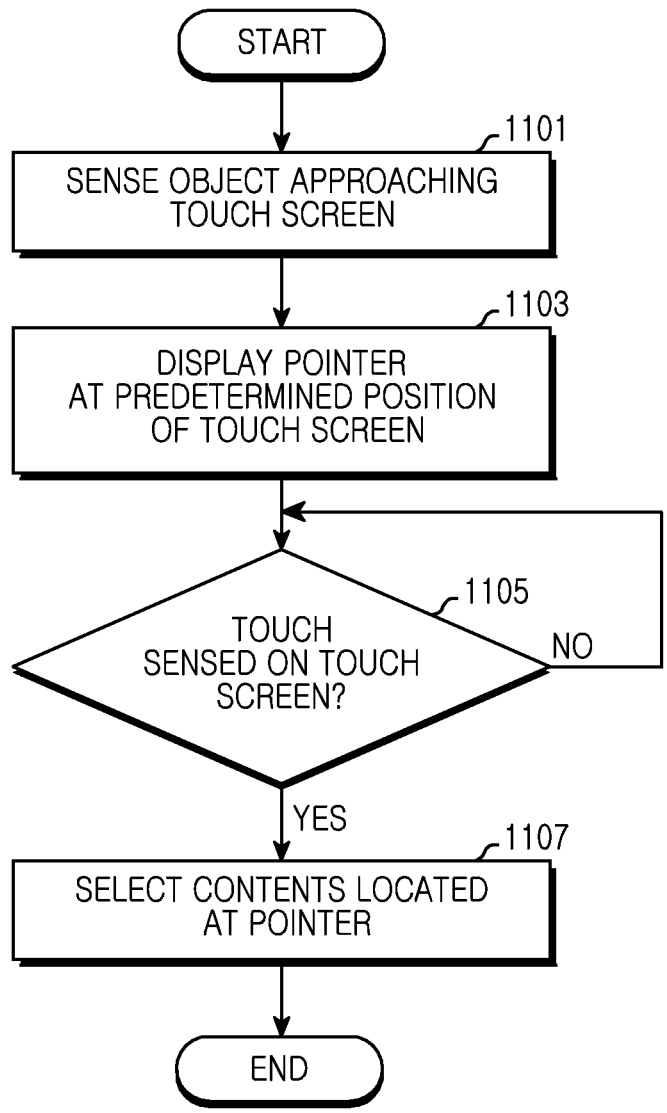
FIG. 11 is a flowchart illustrating a method of operating an electronic device according to one example embodiment among various example embodiments of the disclosure.

FIG. 11 is a flowchart illustrating a method of operating an electronic device according to one example embodiment among various example embodiments of the disclosure.

Referring to FIG. 11, in operation 1101, the electronic device 100 can sense an object approaching the touch screen 190. Here, the object can be a user finger or a hovering pen enabling a hovering input. According to various example embodiments, the aforementioned touch screen 190 can include a touch panel recognizing an input of when a user's finger gets in direct touch with a surface of the touch screen 190 in a capacitive or resistive scheme and the like. Also, this touch panel can be a touch panel enabling proximity touch (also called hovering or non-contact touch) recognizing the finger when the finger approaches a sensing region of the touch screen 190 without contacting the touch screen 190.

After that, in operation 1103, the electronic device 100 can display a pointer (also called a hovering cursor) in a predetermined position of the touch screen 190. According to various example embodiments, a position of the aforementioned pointer can be determined to be in the direction of connecting two points at which distances between at least a portion of the object and the touch screen 190 are the least. For example, the pointer can be displayed at a point spaced a predetermined distance apart from a point which adjoins the edge of the touch screen 190 in the aforementioned direction from a position of the object.

Next, in operation 1105, the electronic device 100 can determine whether it senses a touch on the touch screen 190.

If it senses the touch, in operation 1107, the electronic device 100 can select contents located at the pointer. According to various example embodiments, the electronic device 100 can select the contents 520 when a user touches the touch screen 190. Alternatively, the electronic device 100 can select the contents 520 when the user moves the finger 5 away from the touchscreen 190, or closer to the touch screen 190. Also, the electronic device 100 may perform a specific function when the user performs a drag or a subsequent touch on the touch screen 190.

Next, the electronic device 100 terminates the procedure of the disclosure.

Figure 12:
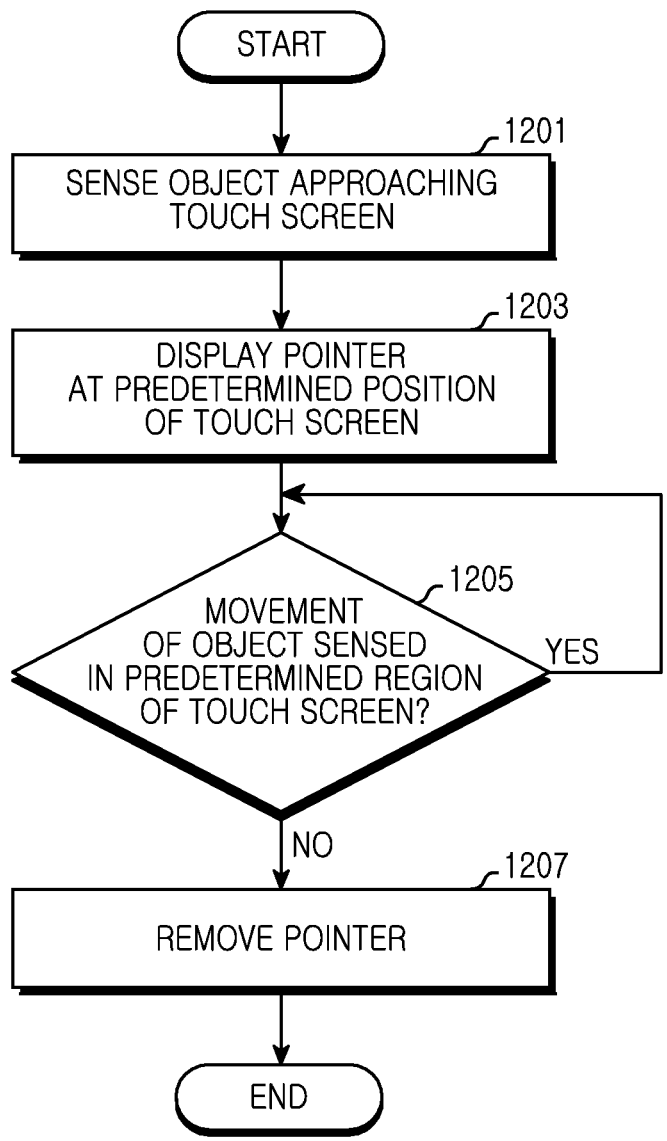
FIG. 12 is a flowchart illustrating a method of operating an electronic device according to one example embodiment among various example embodiments of the disclosure.

FIG. 12 is a flowchart illustrating a method of operating an electronic device according to one example embodiment among various example embodiments of the disclosure.

Referring to FIG. 12, in operation 1201, the electronic device 100 can sense an object approaching the touch screen 190. Here, the object can be a user finger, or a hovering pen enabling a hovering input. According to various example embodiments, the aforementioned touch screen 190 can include a touch panel recognizing an input of data when a user's finger makes direct contact with a surface of the touch screen 190 in a capacitive or resistive scheme and the like. Also, this touch panel can be a touch panel enabling proximity touch (also called hovering or non-contact touch) recognizing the finger when the finger approaches a sensing region of the touch screen 190 without contacting the touch screen 190.

After that, in operation 1203, the electronic device 100 can display a pointer (also called a hovering cursor) in a predetermined position of the touch screen 190. According to various example embodiments, a position of the aforementioned pointer can be determined to be in the direction of connecting two points at which distances between at least a portion of the object and the touch screen 190 are the least. For example, the pointer can be displayed at a point spaced a predetermined distance apart from a point which adjoins the edge of the touch screen 190 in the aforementioned direction from a position of the object.

After that, in operation 1205, the electronic device 100 can determine whether the movement of the object is sensed in a predetermined region of the touch screen 190. For instance, if the movement of the object is not sensed in the predetermined region of the touch screen 190, in operation 1207, the processor 112 can control to remove the pointer.

According to various example embodiments, the processor 112 can control to remove the aforementioned pointer when it does not sense the movement of the object in a predetermined region of the touch screen 190, or when it does not sense the movement of the object for a predetermined time or longer in the predetermined region of the touch screen 190. Also, for instance, the processor 112 may remove the aforementioned pointer when the object moves from the predetermined region of the touch screen 190 to a 2nd predetermined region thereof. Here, the 2nd predetermined region can be an edge portion of the touch screen 190. It can include a case where the object moves to the 2nd predetermined region while maintaining a proximity touch state.

Next, the electronic device 100 terminates the procedure of the disclosure.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

According to various example embodiments of the disclosure, each module can be implemented by software, firmware, hardware or a combination of them. Also, some or entire module can be implemented in one entity, and can identically perform a function of each module. According to various example embodiments of the disclosure, each operation can be executed sequentially, repeatedly, or in parallel. Also, some operations can be omitted, or other operations can be added and executed. For example, each operation can be executed by a corresponding module described in the disclosure.

Methods according to example embodiments disclosed in claims of the disclosure and/or the specification thereof can be realized in a form of hardware, software, or a combination of hardware and software.

In a case of realizing by the execution of software, a computer-readable storage medium storing one or more programs (i.e., software modules) can be provided. One or more programs stored in the computer-readable storage medium can be executed by one or more processors within an electronic device. One or more programs can include instructions for enabling the electronic device to execute the methods according to the example embodiments disclosed in the claims of the disclosure and/or the specification thereof.

These programs (i.e., software modules or software) can be stored in a Random Access Memory (RAM), a nonvolatile memory including a flash memory, a Read Memory (ROM), an Electrically Erasable Programmable ROM (EEPROM), a magnetic disc storage device, a Compact Disk ROM (CD-ROM), a Digital Versatile Disc (DVD) or an optical storage device of other form, and a magnetic cassette. Or, the programs can be stored in a memory configured by a combination of some or all of them. Also, each configuration memory may be included in plural.

Further, the programs can be stored in an attachable storage device accessible to the electronic device through a communication network such as the Internet, an intranet, a LAN, a WLAN and a Storage Area Network (SAN), or a communication network configured by a combination of them. This storage device can access the electronic device through an external port.

Furthermore, a separate storage device on the communication network may gain access to a portable electronic device.

Various example embodiments of the disclosure can provide a more reliable touch screen operating method and electronic device by providing an intuitive user interface using proximity touch and preventing the malfunction caused by the proximity touch.

The functions and process steps herein may be performed automatically or wholly or partially in response to user command. An activity (including a step) performed automatically is performed in response to executable instruction or device operation without user direct initiation of the activity.

While the invention has been shown and described with reference to certain optional embodiments thereof, it will be understood by those skilled in the art that various changes in form and details may be made therein without departing from the disclosure of the invention as defined by the appended claims.

What is claimed is:

1. A method in an electronic device having a touch screen, the method comprising:
   detecting an object approaching a predetermined region of the touch screen as a non-contact touch input;

detecting at least two points in the predetermined region where a distance between the object and the touch screen is least;

detecting a predetermined position of the touch screen that is disposed along an axis connecting the detected at least two points, and disposed at a particular distance from one point of the at least two points; and displaying a pointer at the predetermined position controllable in response to detecting movement of the object, wherein the particular distance is variable in proportion to a retraction distance of the object when, after detecting the at least two points, a third point is detected indicating the object is retracted away from the pointer and towards a terminal edge of the touch screen, and wherein when the third point is detected, the third point replaces detection of the at least two points such that only the third point is detected.

2. The method of claim 1, wherein the object comprises at least a portion of a user finger or a hovering pen, further comprising:

displaying the pointer responsive to sensing the at least a portion of the finger for a predetermined time or longer in a predetermined region of the touch screen.

3. The method of claim 2, wherein the predetermined region is a region extending from at least one side region of the touch screen.

4. The method of claim 2, further comprising setting a lock region extending along an edge of the touch screen in which touch input detection by the touch screen is deactivated.

5. The method of claim 4, further comprising detecting at least two points in the predetermined region where a distance between the object and the touch screen is least from among all detectable distances between portions of the object and the touch screen during the non-contact touch input, wherein the position of the pointer is located at a point spaced a predetermined distance away from the edge of the touch screen, and on the axis.

6. The method of claim 2, wherein the pointer is displayed distant from the finger in a lengthwise direction of the finger.

7. The method of claim 2, further comprising moving the pointer in proportion to a movement of the object, wherein the proportion of movement of the pointer relative to the movement of the object is greater than one.

8. The method of claim 7, wherein a total area of the touch screen includes the predetermined region, and a region outside the predetermined region, the method further comprising:

when the object is sensed by the touch screen in the region outside the predetermined region, removing the pointer while the non-contact touch input is maintained when the movement of the object is not sensed for a second predetermined time or longer in the predetermined region.

9. The method of claim 1, further comprising selecting contents located at the pointer by at least one of:

detecting movement of the object away from the touch screen, and detecting movement of the object towards the touch screen.

10. An electronic device comprising:

a touch screen configured to detect an object approaching a predetermined region of the touch screen as a non-contact touch input; and at least one processor, configured to:

detect at least two points in the predetermined region where a distance between the object and the touch screen is least, detect a predetermined position of the touch screen that is disposed along an axis connecting the detected at least two points, and disposed at a particular distance from one point of the at least two points, and control the touch screen to display a pointer at the predetermined position controllable in response to detecting movement of the object, wherein the particular distance is variable in proportion to a retraction distance of the object when, after detecting the at least two points, a third point is detected indicating the object is retracted away from the pointer and towards a terminal edge of the touch screen, and wherein when the third point is detected, the third point replaces detection of the at least two points such that only the third point is detected.

11. The device of claim 10, wherein the object comprises at least a portion of a user finger or a hovering pen, and the processor is further configured to:

display the pointer in response to sensing the at least a portion of the finger for a predetermined time or longer in a predetermined region of the touch screen.

12. The device of claim 11, wherein the predetermined region is a region extending from at least one side region of the touch screen.

13. The device of claim 11, wherein the processor is further configured to set a lock region extending along an edge of the touch screen in which touch input detection by the touch screen is deactivated.

14. The device of claim 13, wherein the processor is configured to detect at least two points in the predetermined region where a distance between the object and the touch screen is least from among all detectable distances between portions of the object and the touch screen during the non-contact touch input, wherein the position of the pointer is located at a point spaced a predetermined distance away from the edge of the touch screen, and on the axis.

15. The device of claim 11, wherein the processor is configured to display the pointer distant from the finger in a lengthwise direction of the finger.

16. The device of claim 11, wherein the processor is configured to move the pointer in proportion to a movement of the object, and the proportion of movement of the pointer relative to the movement of the object is greater than one.

17. The device of claim 16, wherein a total area of the touch screen includes the predetermined region and a region outside the predetermined region, the processor is configured to:

when the object is sensed by the touch screen in the region outside the predetermined region, remove the pointer while the non-contact touch input is maintained when the movement of the object is not sensed for a second predetermined time or longer in the predetermined region.

18. A method of operating an electronic device having a touch screen, the method comprising:

detecting approach of at least a portion of a finger to the touch screen as a non-contact touch input, and maintenance of the non-contact touch input for a predetermined time or longer in a predetermined region extending from at least one side region of the touch screen;

detecting at least two points in the predetermined region where a distance between the finger and the touch screen is least from among all detectable distances between detectable portions of the finger and the touch screen during maintenance of the non-contact touch input;

detecting a predetermined position of the touch screen that is disposed along an axis connecting the detected at least two points disposed at a particular distance from one point of the at least two points, and displaying a pointer at the position, the pointer moveable in proportion to movement of the finger;

selecting contents indicated by the pointer in response to detecting transition from the non-contact touch input to at least one of: a direct touch between the finger and the touch screen, movement of the finger away from the touch screen, and movement of the finger towards the touch screen; and removing the pointer when movement of the finger is not detected for a second predetermined time or longer in the predetermined region of the touch screen, wherein the particular distance is variable in proportion to a retraction distance of the finger when, after detecting the at least two points, a third point is detected indicating the finger is retracted away from the pointer and towards a terminal edge of the touch screen, and wherein when the third point is detected, the third point replaces detection of the at least two points such that only the third point is detected.

* * * * *